UNITED STATES PATENT OFFICE.

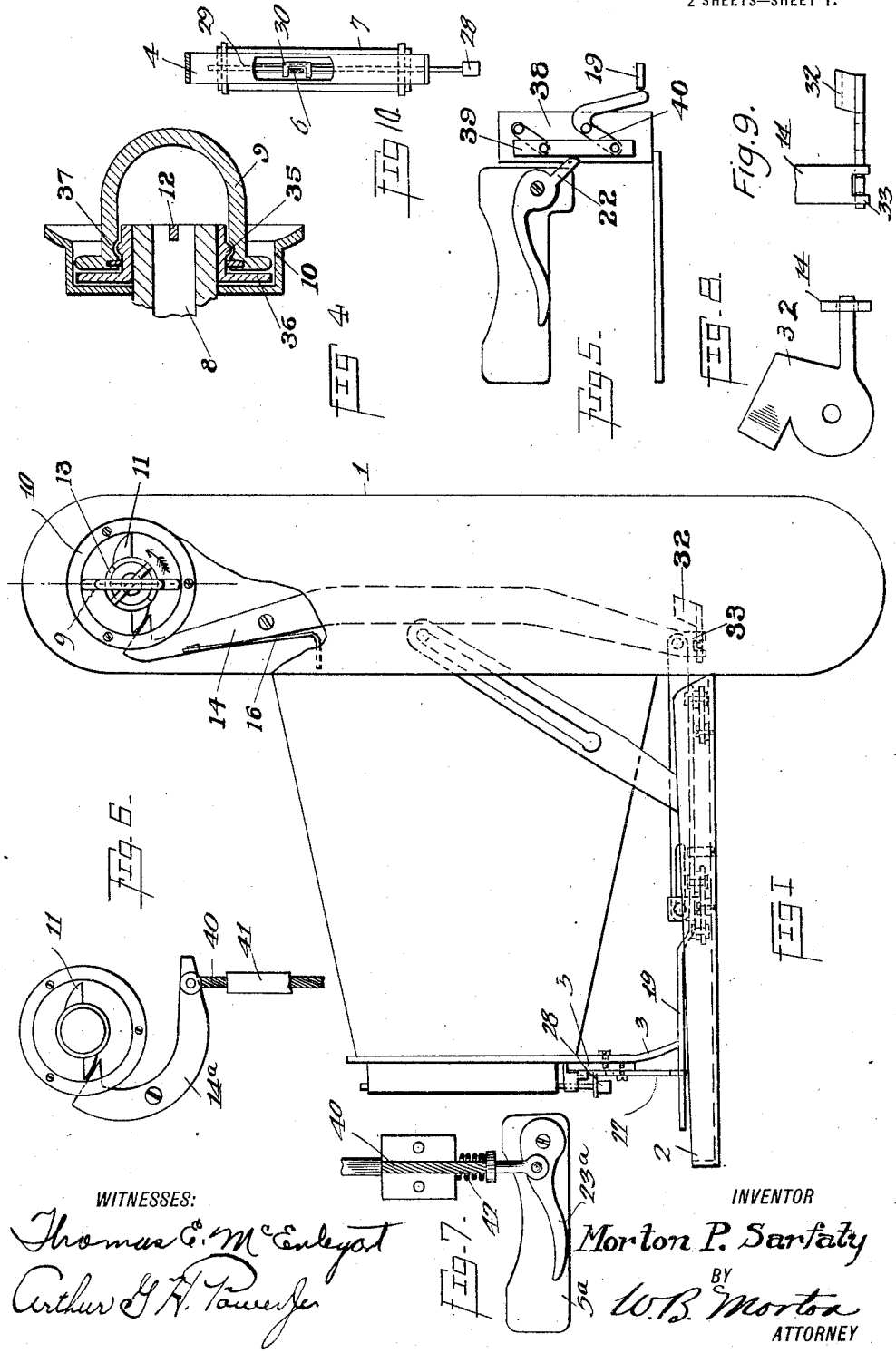

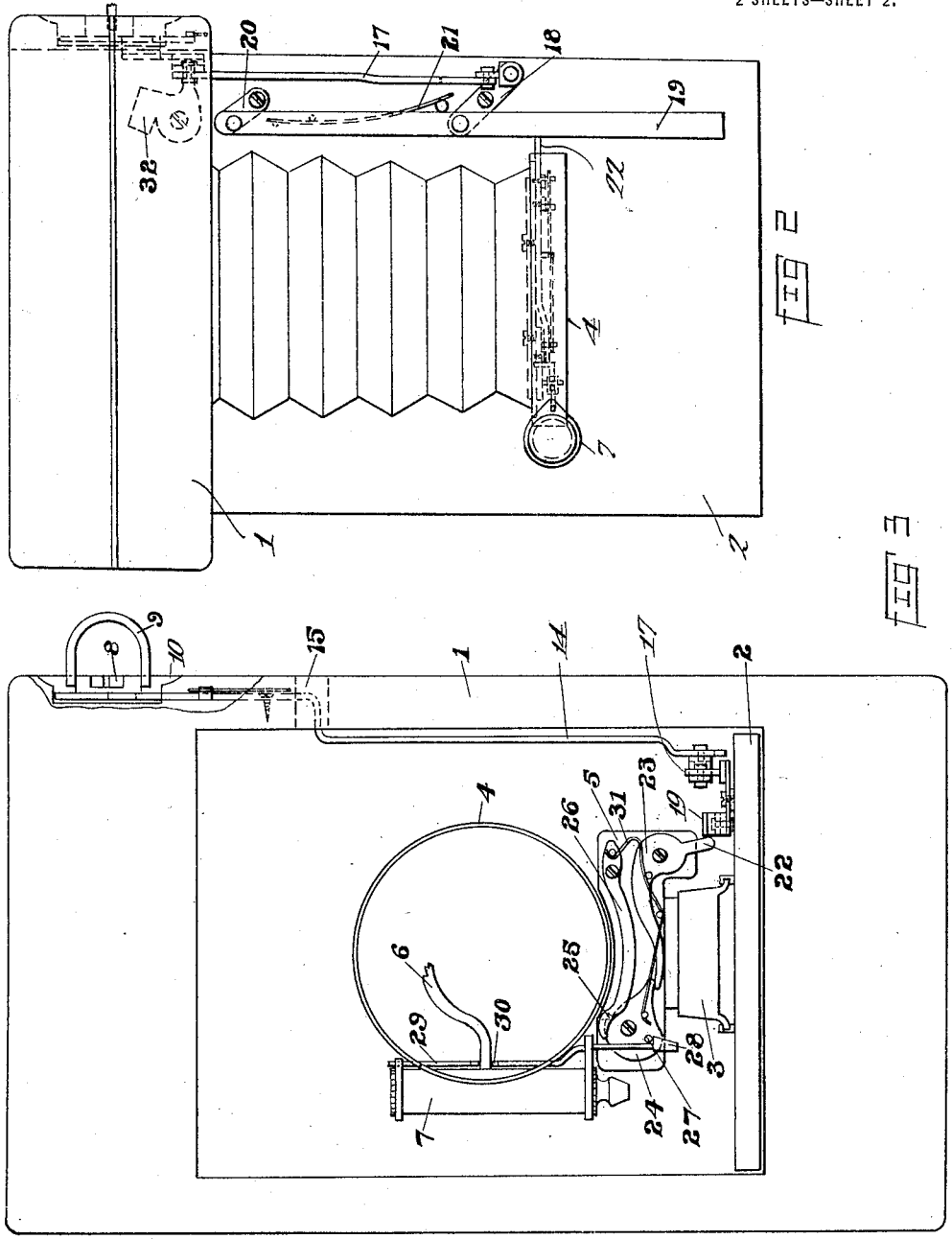

MORTON P. SARFATY, OF NEW YORK, N. Y.

PHOTOGRAPHIC CAMERA.

1,389,992.  Specification of Letters Patent.  Patented Sept. 6, 1921.

Application filed March 15, 1915, Serial No. 14,362. Renewed February 11, 1921. Serial No. 444,265.

*To all whom it may concern:*

Be it known that I, MORTON P. SARFATY, a citizen of the United States, and a resident of New York city, county of New York, and State of New York, have invented new and useful Improvements in Photographic Cameras, of which the following is a specification.

This invention relates to cameras, particularly of the film roll type, and has for its object to provide a device whereby it is impossible to effect a double exposure of any section of the film.

As is well known to amateur photographers it is not an infrequent occurrence to produce double exposures, or else through extra precaution leave a picture section of the film unexposed for the reason that when any time elapses between the successive exposures it is difficult to recall whether or not the film has been advanced after the last exposure. The loss of film due to such double exposures or skipped blank sections is not an inconsiderable amount, but the chief disadvantage is that each double exposure means two spoiled pictures frequently of views which cannot be again obtained or of events which occur but once.

With my novel invention it is impossible to expose the film section more than once, and if the user of the camera attempts to make a double exposure the failure of operation informs him that the film has been exposed so that he has merely to advance the film through another section to be ready to take a picture.

A further object of my invention is to provide a device of the character described which will not interfere in any way with the normal operation of the camera, and which is in fact entirely inoperative except when a double exposure of the same film is attempted.

A further object of the invention is to provide a device of the class described which may be readily attached to cameras already in use, or may be embodied in newly manufactured cameras without change in the design.

A further object of the invention is to provide a device of this character which will not detract from the appearance of the camera, and which may in fact be made an ornamental part of the camera.

With the above objects in view my invention consists of a coöperating device between the shutter and the film advancing spindle, whereby after the shutter is operated to expose a section of the film it cannot be again operated until the film has been advanced to bring a plain section into the field of the lens.

In the accompanying drawings and specification I have illustrated and described a preferred embodiment of my invention, but it will of course be understood that my invention is in no way limited to the details of construction therein shown and described.

In such drawings Figure 1 is a side elevation of a camera embodying my invention of the type in which the pivot of the gate is parallel with the axes of the film rolls;

Fig. 2 is a plan view of the camera;

Fig. 3 is an end view from the front;

Fig. 4 is a detailed view of the device;

Figs. 5, 6 and 7 are detailed views showing my modifications of the mechanism.

Figs. 8, 9, and 10 are further detail views.

Referring to the drawings 1 indicates the casing of the camera of the folding type, having a front board 2 adapted to close the casing when the camera is folded, and to provide when the camera is open a support for the carriage 3 of the lens plate whereby the lens plate may be adjusted back and forth to properly focus the camera.

The lens, diaphragm and shutter mechanism have not been shown in detail for the reason that they form no part of my invention, my attachment being applicable to all makes of cameras, but it will be understood that these parts are inclosed in the usual circular housing 4 supported on the lens plate, the lower portion of which is shown at 5 between the housing and the carriage 3. The only part of the shutter actuating mechanism which I have shown in the drawing is the arm 6 which is vertically reciprocated (as to the right in Fig. 3) to snap the shutter. The arm 6 may be actuated in any preferred manner, as for instance by a piston in the pneumatic cylinder 7 to which piston the arm is attached. It will be understood that the opening and closing of the shutter of the camera whether for a snap shot or time exposure, involves a complete reciprocation of the arm 6, that is, an upward movement of predetermined extent and its return to the normal lower position shown in Fig. 3. The mechanism so far shown is typical of hand cameras generally, most of which, if not all, embody in their shutter mechanism a reciprocating actuating arm either directly actuated by a manual trip or provided also with the pneumatic attachment described.

It will be understood that the cameras to which my invention is applicable are provided with the usual film winding spindle 8 projecting through the top wall of the casing 1 and provided with the pivoted bail or finger piece 9 indirectly connected to the spindle as will be described. Within the socket 10 which is set in the wall of the casing to form a bearing for the spindle, I provide the spindle with a double pointed ratchet or cam wheel 11 to which the bail 9 is pivoted and which may be fast to the spindle, but is preferably connected thereto so as to have a slight lost motion, as for instance by means of a pin 12 through the spindle and projecting into the slots 13 in the hub of the cam wheel. Coöperating with the projections of the cam wheel is a lever arm 14 whose short arm works in a suitable slot in the upper face of the wall of the casing and whose free arm is bent downwardly through the hole 15 in the wall of the casing, thence extends under the wall to the point adjacent the hinge of the front board 2 as will be readily seen in Figs. 1 and 3. The arm 14 is provided with a tooth coöperating with the projections of the cam wheel, and also with the spring 16 holding the lever arm against the cam wheel. Pivotally connected to the free end of the arm is a link 17 which extends out over the front board 2 when the gate is open, as shown, and folds on its pivotal connection with the lever arm 14 when the gate is closed. The link 17 is connected by means of a suitable pin slot connection with a short lever 18 pivoted to the upper surface of the gate, the opposite end of the lever 18 having connected to it a rod or bar 19 which is also connected to a pivotal link 20 to have a lateral movement when the lever 18 is turned on its pivot as will be obvious from an inspection of Fig. 2. The bar 19 is provided with a spring 21 adapted to normally hold it in its position nearest the edge of the gate.

The free end of the rod 19 is bent upwardly beyond its connection with the lever 18 so as to engage at any point in its length with a depending projection 22 on the lever 23 pivoted on the lens plate 5 above the carriage 3. The opposite end of the lever 23 extends across the face of the lens plate and normally projects under the horizontal ear on the cam dog 24 pivoted to the plate 5 adjacent its other edge. The dog 24 is provided on its upper edge with a tooth 25 which is adapted to be caught by a pin in the end of the pawl 26 when the dog 24 is turned on its pivot through the action of the lever 23.

The dog 24 is also provided with a pin 27 which projects over a lug 28 on the end of the rod 29 mounted for vertical reciprocation on the side of the cylinder 7 and having a fork 30 engaging on opposite sides of the shutter operating arm 6 so as to be reciprocated both up and down by the movement of the shutter operating arm. A single spring 31 is bent around the pins on the arm 23, the dog 24 and pawl 26, to hold them in proper coöperating position as shown in Fig. 3. The above described mechanism constitutes all that is essential to the operation of my invention which will now be described.

In Fig. 3 the parts are shown in the position which they assume after a picture has been snapped in which position the pin 27 engages the lug 28 and prevents the upward movement of the rod 29 thereby locking the shutter actuating arm against movement. Should the user of the camera attempt to operate the shutter again to expose the film without turning the film roll to advance a fresh section, he will find the shutter locked and the operating button or trip immovable which will immediately inform him of his neglect to change the film. Upon changing the film, which will be done by turning the spindle in the direction of the arrow on Fig. 1, one of the projections of the cam 11 will oscillate the arm 14 and thereby through the link 17 and parallel arms 18 and 20 shift the bar 19 laterally against the projection 22 thereby turning the lever 23 on its pivot and raising the inner end of the dog 24 which shifts the pin 27 laterally off of the lug 28. The movement of the dog 24 thus effected is sufficient to bring the tooth 25 beyond the pin of the pawl 26 by which it is caught and held with the pin 27 out of the path of movement of the lug 28.

As soon as the projection on cam 11 passes the arm 14, the spring 21 turns the bar to its outer position allowing the lever 23 to fall by the action of the spring 31 but leaving the dog 24 caught by the pawl 26 and held against the tension of the spring.

Now when the shutter is operated in the usual manner the lug is free of the pin 27 and the bar 29 will move freely upward. In its upward movement however the lug 28 will engage the end of the pawl 26 lifting its pin clear of the dog 24, allowing the spring 31 to return the dog 24 to the position shown. On the return movement of the rod 29 the lug 28 will spring past the pin 27 and be again caught by the pin to prevent movement of the rod until the film roll is again turned to repeat the operation just described.

In order that the turning of the roll when the camera is closed properly actuates the shutter locking mechanism, I provide an auxiliary operating lever 32 pivoted on the inner face of the partition between the film roll and the middle portion of the casing in position to engage the projection 22 when the lens plate is slid back into the casing as more particularly shown in Fig. 8. The lever 32 is turned by means of a fork 33 forming an extension of the lever 14 which fork engages a projection on the end of the lever 32. It will be understood of course that the operation produced by the lever 32 is the same as effected by the bar 19, the two moving in synchronism at all times.

The lost motion connection between the spindle 8 and the cam 11 is provided in order that in case the projection on the lever 14 is engaged with the cam projection when the film has been advanced to a sufficient extent, it may be turned back slightly to allow the spring 16 to return the lever 14 to its free position.

To prevent accidental operation of the film reel spindle of sufficient extent to trip the shutter lock, I may provide the bail 9 with a clamping device such as shown in Fig. 4, whereby the spindle is free only when the bail is raised to its vertical position to be turned. For this purpose I form a bead 35 on the hub 36 of the cam above the pivot pins of the bail. The inner face of the bail is provided with grooves 37 which embrace the bead when the bail is raised but in any other position ride over the bead and expand the bail into frictional engagement with the socket 10 and hold the spindle against any accidental displacement by engagement for instance with the pocket or carrying case in taking the camera out.

In some cameras the lens plate is vertically adjustable to take in more of the field at one side or the other of the optical axis, for instance in photographing tall buildings. With such cameras I may interpose between the lever 23 and bar 19, a device as shown in Fig. 5 to maintain an operating connection between the two at all positions of adjustment of the lens plate. This connection comprises a plate or bracket 38 attached to the carriage 3 at one side of the lens plate and carrying the bar 39 on parallel links so as to be shifted laterally while maintaining a vertical position. The lower link 40 has a crank arm extension which lies against the bar 19 while the opposite edge of the bar 39 rests against the extension 22 of the trip lever.

In Figs. 6 and 7 I have illustrated portions of a modified design which may be employed without modification in any type of camera without special design as to dimensions, etc. In the modified device I employ instead of the straight lever 14 a bell lever 14ª to whose free ends is attached the end of a Bowden cable 40 of usual construction with the flexible casing 41 which may be turned in any direction to direct the cable to the front of the lens plate as shown at 5ª in Fig. 7. The end of the cable is attached to the lever 23ª which is similar to the lever 23 in such a position that a pull on the cable will raise the lever and trip the locking dog. A spring 42 is provided to turn the lever and cable when the pull on the cable is relieved by the disengagement of the clutch projections 11 and lever 14ª. The mechanism which coöperates with the lever 23ª is identical with the mechanism of the preferred modification and has therefore not been shown in these figures.

Having thus described my invention, what I claim and desire to secure by Letters Patent is:

1. In a folding camera having a lens plate adjustable to different positions, a shutter operating mechanism thereon, a latch for said shutter mechanism also supported by said lens plate, a film winding spindle, and a trip for said latch operated by movement of said spindle, said trip being mounted on the camera case and having a part engaging said latch in different positions of adjustment of said lens plate but disconnected therefrom.

2. In a folding camera, having a lens plate adjustable to different positions, a hinged front board supporting said lens plate when extended, a shutter operating mechanism thereon, a latch for said shutter mechanism, also supported by said lens plate, a film winding spindle, and a trip for said latch operated by movement of said spindle, said trip being mounted on the camera case and having a part on said front board engaging said latch but disconnected therefrom.

3. In a camera having a horizontally and vertically adjustable lens plate, a hinged front board supporting said lens plate when adjusted horizontally to operative position, a shutter operating mechanism supported on said lens plate, a latch for said shutter mechanism, also supported by said lens plate, a film winding spindle, and a trip for said latch operated by movement of said spindle, said trip being mounted on the camera case and having a part on said gate engaging said latch in different positions of adjustment both vertically and horizontally but disconnected therefrom.

4. In a camera having a shutter operating arm adapted to make a complete reciprocation for each exposure, a latch for said shutter arm, a trip for said latch, means for operating said trip and means operated on the return movement of said shutter arm for resetting said trip.

5. In a folding camera having a hinged front board and a lens support adjustable thereon, the combination of a shutter mechanism carried by said lens support, a latch for said shutter mechanism mounted on said lens support, a film winding spindle and a trip mechanism for said latch operated by movement of said film winding spindle and comprising articulated connections having a joint substantially coincident with the axis of the hinge of said front board.

6. In a folding camera having a hinged front board and a lens support adjustable thereon, the combination of a shutter mechanism carried by said lens support, a latch for said shutter mechanism mounted on said lens support, a film winding spindle and a trip mechanism for said latch operated by movement of said film winding spindle and comprising a member extending along said front board and engaging said latch in different positions of adjustment of said lens support, a member within the camera case operated by the movement of the spindle and connected to said front board member, said connections comprising a pivotal joint substantially coincident with the pivot of the hinge of the front board.

7. In a folding camera having a hinged front board and a lens support adjustable thereon, the combination of a shutter mechanism carried by said lens support, a latch for said shutter mechanism mounted on said lens support, a film winding spindle and a trip mechanism for said latch operated by movement of said film winding spindle and comprising a member extending along said front board and engaging said latch in different positions of adjustment of said lens support, a member within the camera case operated by movement of the spindle and connected to said front board member, said connections comprising a pivotal joint substantially coincident with the pivot of the hinge of the front board, and a latch operating member within the camera case in position to engage the latch when the camera is closed.

Signed at New York in the county of New York and State of New York this 13th day of March, 1915.

MORTON P. SARFATY.

Witnesses:
W. B. MORTON,
THOMAS E. MCENTEGART.